UNITED STATES PATENT OFFICE.

FREDERIC LEWIS NATHAN AND WILLIAM RINTOUL, OF STEVENSTON, AND FRANK BAKER, DECEASED, LATE OF STEVENSTON, SCOTLAND, BY HENRY BAKER, OF ETON, WINDSOR, ENGLAND, ADMINISTRATOR OF SAID FRANK BAKER, ASSIGNORS TO NOBEL'S EXPLOSIVES COMPANY, LIMITED, OF GLASGOW, SCOTLAND.

GELATINIZED PROPELLANT-EXPLOSIVE AND PROCESS OF PREPARING SAME.

1,280,278.     Specification of Letters Patent.     Patented Oct. 1, 1918.

No Drawing.     Application filed February 26, 1914. Serial No. 821,336.

*To all whom it may concern:*

Be it known that Colonel Sir FREDERIC LEWIS NATHAN and WILLIAM RINTOUL, both subjects of the King of Great Britain and Ireland, and residing at Ardeer, Stevenston, Ayrshire, Scotland, and FRANK BAKER, deceased, late of Ardeer, Stevenston, Ayrshire, Scotland, invented a certain new and useful Gelatinized Propellant-Explosive and Process of Preparing Same, of which the following is a specification.

Present-day smokeless powders are generally prepared by gelatinizing nitrocellulose, either when used alone or with nitroglycerin, by a volatile solvent but this entails certain disadvantages, the drying process for removing the solvent being lengthy and, what is worse, besides tending owing to the heating to affect the stability, is incomplete, so that during storage an after-drying and slow production of irregularities in the material can occur.

In the course of investigations upon the stabilizing of nitric-ester-containing explosives we found that certain esters of substituted carbaminic acids containing one or more aromatic radicals—see United States application No. 771,623—Patent No. 1090644, granted March 17, 1914; are particularly adapted for use for stabilization but we have further found that among these bodies some are also effective gelatinizers for mixtures of nitroglycerin and nitrocelluloses.

According to the present invention therefore we utilize one or more such substances to produce a gelatinized propellant explosive from these nitric esters, the gelatinizer remaining in the final product and acting as stabilizer.

The following is a list of some of the substances referred to which possess this double property, namely:—

| | |
|---|---|
| Phenyl urethane | $C_9H_{11}O_2N$ |
| Ethyl phenyl urethane | $C_{11}H_{15}O_2N$ |
| Diphenyl urethane | $C_{15}H_{15}O_2N$ |
| Ortho-tolyl urethane | $C_{10}H_{13}O_2N$ |
| Ethyl ortho-tolyl urethane | $C_{12}H_{17}O_2N$ |
| Phenyl ester of ethyl phenyl carbaminic acid | $C_{15}H_{15}O_2N$ |
| Phenyl ester of diethyl carbaminic acid | $C_{12}H_{15}O_2N$ |

Moreover, homologues and certain derivatives of these substances possess like properties. Thus the substitution of a methyl for an ethyl group in ethyl phenyl urethane or of a hydrogen atom in a phenyl group by the grouping —$O.CH_3$ or —$O.C_2H_5$ in one of the above compounds but little affects their gelatinizing and stabilizing power.

In carrying the invention out in one way 7.5 parts by weight of the urethane are dissolved in 40 parts of nitroglycerin and this solution then incorporated by the wet incorporation method of Lundholm English Patent No. 10376 of 1889, with 52.5 parts of soluble nitrocellulose of 12.6% nitrogen content which has been prepared by nitrating cotton waste at the ordinary temperature, and purified by boiling with water.

The pasty admixture so obtained is freed as far as possible from water by pressing and rolling between rollers heated to from 40° to 50° C. after which it is again rolled at a temperature of from 50° to 70° C. and a gelatinized sheet of the desired thickness obtained which is either cut into strips or flakes or extruded from a press, the pressure required in the latter (usually some hundreds of atmospheres) falling with rise in the temperature adopted which may conveniently be between 50% and 70° C.

The bodies considered vary in their gelatinizing effect and the solution of the material to be used in any particular case also depends largely upon the nature of the nitrocellulose to be treated, a powerful gelatinizer being more suitable for gun cotton or insoluble nitrocellulose than weak gelatinizers such as phenyl urethane which are quite satisfactory for nitrocellulose of the kind employed in making celluloid. Again the greater the proportion of nitrocellulose in the mixture the more effective the gelatinizer, which has both to colloid the fibrous nitrocellulose and to increase the plasticity of the final product, should be.

As certain of the bodies are better gelatinizers than stabilizers or vice versa it may be convenient to use mixtures thereof, the poorer gelatinizing power of the one being compensated by the better gelatinizing power of the former and vice versa as regards their stabilizing effects.

The amount of the gelatinizing and stabilizing agent or agents used will vary, but generally be between 5% and 12% of the whole mixture.

The physical properties of the agent or agents used will affect the above method of introduction into the mixture for while liquid bodies such as ethyl tolyl urethane are easily dissolved in the nitroglycerin, solids require to be finely ground and thoroughly agitated with the nitroglycerin or to be melted, if of low fusing point, and so added to the nitroglycerin. By admixture the melting point may be reduced, a mixture of some of these bodies which separately are solid, being more or less liquid at temperatures but little above normal. Where the substance or substances used is or are soluble in water and the wet incorporation method is used, the suspension should be effected in a solution of the substance or substances of such strength that having regard to the mixture used the right final composition results.

Having now described our invention, what we claim as new and desire to secure by Letters Patent is:—

1. The process for producing a gelatinized and stabilized propellant explosive which comprises mixing together nitroglycerin, nitrocellulose and an aromatic-radical-containing substituted carbamic acid ester capable both of gelatinizing nitrocellulose and of stabilizing nitric esters, and a second body also possessing both these properties, one of the latter two bodies possessing the first mentioned property to a smaller extent and the second mentioned property to a larger extent than the second mentioned body, and then gelatinizing the mixture.

2. The process for producing a gelatinized and stabilized propellant explosive which comprises mixing together nitroglycerin, nitrocellulose and an aromatic-radical-containing urethane capable both of gelatinizing nitrocellulose and of stabilizing nitric esters, and a second body also possessing both these properties, one of these latter two bodies possessing the first mentioned property to a smaller extent and the second mentioned property to a larger extent than the second mentioned body, and then gelatinizing the mixture.

3. A gelatinized and stabilized propellant explosive comprising nitro-cellulose, nitroglycerin, an aromatic-radical-containing substituted carbamic acid ester capable both of gelatinizing nitrocellulose and of stabilizing nitric esters, and another stabilizing and gelatinizing compound also possessing both these properties, one of these two stabilizing and gelatinizing compounds possessing the first mentioned property to a smaller extent and the second mentioned property to a larger extent than the other such compound.

4. A gelatinized and stabilized propellant explosive comprising nitro-cellulose, nitroglycerin, an aromatic-radical-containing urethane capable both of gelatinizing nitrocellulose and of stabilizing nitric esters, and another stabilizing and gelatinizing compound also possessing both these properties, one of these two stabilizing and gelatinizing compounds possessing the first mentioned property to a smaller extent and the second mentioned property to a larger extent than the other such compound.

5. A gelatinized propellant explosive containing nitroglycerin, nitrocellulose and a phenyl ester of ethyl phenyl carbamic acid.

6. A gelatinized propellant explosive containing about 40 parts of nitroglycerin, about 50 parts of nitrocellulose, and a small amount of a phenyl ester of ethyl phenyl carbamic acid.

In testimony whereof we have signed our names to this specification in the presence of subscribing witnesses.

FREDERIC LEWIS NATHAN.
WILLIAM RINTOUL.
HENRY BAKER,
*Administrator of the estate of Frank Baker, deceased.*

Witnesses:
N. B. MILNE,
ALEX. FORBES,
BERTRAM H. MATTHEWS,
P. A. OUTHWAITE.